Patented Dec. 18, 1951

2,579,330

UNITED STATES PATENT OFFICE 2,579,330

METHYLOL PHENOL UNSATURATED ETHERS

Robert W. Martin, Lenox, Mass., assignor to General Electric Company, a corporation of New York No Drawing. Application January 4, 1951, Serial No. 204,463

14 Claims. (Cl. 260—613)

This application is a continuation-in-part of my earlier filed application, Serial No. 122,128, filed October 18, 1949, and assigned to the same assignee as the present invention.

This invention relates to methylol phenol ethers corresponding to the general formula:

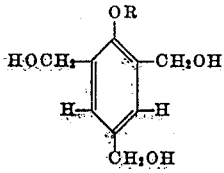

where R represents an unsaturated aliphatic group containing at least three carbon atoms, e. g., allyl, methallyl, crotyl, butenyl, etc., as well as mono- and polyhalogenated derivatives of the aforesaid unsaturated aliphatic groups, e. g., 2-chloroallyl, 3-chloroallyl, 3-chloro-2-methylallyl, 1-chloro-2-butenyl, etc., groups. The halogen may also be bromine, fluorine, etc. The invention also includes mixtures of the above-identified chemical compounds in which the latter comprise a major proportion of the mixture and which also contain compounds corresponding to general formula:

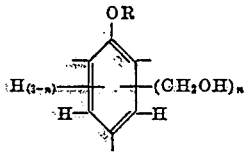

where R has the meaning given above and $n$ is an integer equal to from 1 to 2, inclusive.

The chemical compositions embraced by the instant application are generally prepared from pure crystalline metallic salts of 2,4,6-tris(hydroxymethyl) phenol wherein the metallic atom substituted for the hydrogen on the phenolic hydrogen group is either sodium or barium. It has been found that sodium and barium salts of trimethylol phenol may be formed very simply and isolated as crystalline compounds. More particularly, it has been found that crystalline sodium and barium salts of trimethylol phenol may be prepared by effecting reaction between about three mols of formaldehyde and one mol of phenol in the presence of about one mol of alkali such as the hydroxides of sodium and barium at a temperature such that no resinous material is formed. This temperature has been found to range up to about 65° C. above which temperature undesired side reactions take place. The salt of trimethylol phenol can then be precipitated by diluting or pouring the reaction mixture into a suitable water-miscible solvent and separated from the liquid by filtration, decantation or other suitable means.

While the example above calls for molar quantities of alkali, only catalytic quantities of alkali, for example, about one per cent by weight, are required for the phenol-formaldehyde reaction. It will be seen therefore that phenol and formaldehyde may be allowed to react to form the trimethylol compound in the presence of a small amount of alkali at which time the rest of the alkali may be added to form the salt.

Many solvents are suitable for precipitating the salts of trimethylol phenol, e. g., methanol, ethanol, n-propanol, isopropanol, tertiary butanol, secondary butanol, isobutanol, n-butanol, tertiary amyl alcohol, allyl alcohol, diacetone alcohol, butyl carbitol, pyridine, 2-(2'-hydroxyethyl) pyridine, phenyl cellosolve, acetone, acetonitrile, propionitrile, morpholine, diethylenetriamine, methylal, dimethyl cellosolve, dioxane, etc. In general alcohols with no more than four carbon atoms are the most efficient precipitating agents and particularly those with two or three carbon atoms. The preferred precipitating agents are ethanol, propanol, isopropanol and acetone. Of these, ethanol is most suitable from the point of view of low cost, availability and purity of the product obtained. Mixtures of the above precipitating agents also have been found to be very useful. Among the mixtures which are suitable are, by volume, 50–50 n-butanol and methanol, 50–50 methanol and acetone and 50–50 n-amyl alcohol and methanol.

The only metal hydroxides found to be suitable for the preparation of salts of 2,4,6-tris(hydroxymethyl) phenols or trimethylol phenols are sodium and barium hydroxides. While formaldehyde is mentioned above, equivalent amounts of paraformaldehyde may be used.

The following examples will illustrate the preparation of the sodium and barium salts of trimethylol phenol or 2,4,6-tris(hydroxymethyl) phenol:

Example I

To 188 parts by weight (2 mols) of phenol were added 90 parts by weight (2.25 mols) of sodium hydroxide which had been previously dissolved in seventy parts by weight of water. The mixture was cooled and allowed to crystallize; 588 parts by weight (7.3 mols) of formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3–4 hours the resultant precipitate was filtered and dried.

Theoretical yield—412 parts by weight
Actual yield—335 parts by weight or 81.3% of theory

Example II

To 76.2 parts by weight (0.945 mol) of formalin 23.5 parts by weight (0.25 mol) of phenol were added mixed and cooled to 30° C. To this mixture twelve parts by weight (0.3 mol) of sodium hydroxide in 8 parts by weight of water were added. The reaction mixture was heated at 40° C. for seventy-two hours. Next, 800 parts by weight of ethanol were added to the mixture with vigorous stirring. The resulting precipitate was filtered after standing three or four hours and washed with acetone and dried.

Theoretical yield—51.5 parts by weight
Actual yield—49.4 parts by weight or 96% of theory

Example III

Formalin in the amount of 140 parts by weight (1.73 mols), forty-seven parts by weight (0.5 mol) of phenol and forty-seven parts by weight (0.55 equivalents) anhydrous barium hydroxide dissolved in seventy-five parts by weight of hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting precipitate, after standing a few hours, was filtered off, washed with acetone and dried in a vacuum desiccator.

Theoretical yield—125.8 parts by weight
Actual yield—97.9 parts by weight or 77.8% of theory

Example IV

To 76.2 parts by weight (0.945 mol) of formalin were added while stirring 23.5 parts by weight (0.25 mol) of phenol and twelve parts by weight (0.33 mol) of sodium hydroxide, dissolved in fifteen parts by weight of water. The temperature of the reaction mixture was held at 30° C. or less for two hours. The mixture was put in an oven for twenty-two hours at a temperature of 40° C. Next, 804 parts by weight of n-propanol was poured into the reaction mixture and the mix stirred. The resulting precipitate was filtered off, washed with acetone and ether and dried in a vacuum desiccator.

Theoretical yield—51.5 parts by weight
Actual yield—50.8 parts by weight or 98% of theory The identity of the sodium 2,4,6-tris(hydroxymethyl)-phenate was established by preparing the known derivative 2,4,6-tris(acetoxymethyl) phenyl acetate. More particular details of this identification are found in my earlier application Serial No. 122,128, filed October 18, 1950, of which the present application is a continuation-in-part.

The sodium and barium 2,4,6-tris(hydroxymethyl) phenates described above are then reacted with other compounds to provide a class of primary polyhydric alcohols with a wide range of applications in the chemical, plastics and coating arts. More particularly, such compounds are the ethers formed by the etherification of the phenolic hydroxyl groups, and which form the subject matter of the present application. Such etherification considerably retards the tendency of the tris (hydroxymethyl)-compound to resinify and hence makes it available for a number of other reactions and applications not possible with sodium tris (hydroxymethyl) phenol. For example, etherification of the phenolic hydroxyl group greatly improves the alkali resistance of resinous compositions containing them compared to the same compositions wherein the phenolic group has not been etherified.

The ethers prepared from the sodium and barium 2,4,6-tris(hydroxymethyl) phenates may be represented by the general formula:

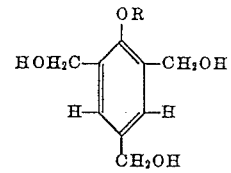

where R has the meaning given above. The following examples illustrate the preparation of various ethers coming within the scope of the above-identified general formula. All parts are by weight.

Example V

A mixture of 139 parts sodium 2,4,6-tris(hydroxymethyl) phenate, 126 parts methyl iodide and 440 parts methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl) benzene was a viscous light brown syrup.

Yield—118 parts by weight. Theory=134 parts by weight
Methoxyl content=15.33%, 15.70%
Theory=15.66%

Example VI

In this example, 42 grams sodium trimethylol phenate, 28 grams allyl bromide, 8 grams $K_2CO_3$ and 5 ml. acetone were mixed together and refluxed for 12 hours. The solution was filtered to remove any insoluble salts and the acetone was removed under vacuum to give 30 grams of a very light tan liquid. Analysis of this material showed it to be the allyl ether of methylol phenol and to have the following percents hydrogen and carbon, and the physical constants shown below:

Calculated for $C_{12}H_{16}O_4$: C, 64.26%; H, 7.19%.
Found: C, 64.9%; H, 7.0%
Density=1.221; refractive index=1.575

The allyl ether of trimethylol phenol was also prepared by forming a mixture of 42 grams sodium trimethylol phenate, 28 grams allyl bromide, 8 grams $K_2CO_3$ and 500 ml. methanol. The mixture was refluxed for about 6 hours and the major portion of solvent removed under a vacuum. The product was then mixed with water and extracted with ether to remove any unreacted allyl bromide. The aqueous solution was then extracted with amyl alcohol and the latter removed from the product by heating at 50°–80° C. under a vacuum of 1–2 mm. to give 31 grams of a light brown liquid which had the following physical constants and carbon and hydrogen analyses:

Calculated for $C_{12}H_{16}O_4$: C, 64.26%; H, 7.19%.
Found: C, 65.67%; H, 7.20%
Density=1.20; refractive index=1.579

Example VII

To 210 parts sodium 2,4,6-tris(hydroxymethyl)-phenate was added a solution of 130 parts allyl bromide in 475 parts methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl)benzene, was a brown syrup.

Yield=140 parts by weight. Theory=224.

Example VIII

Same as Example VII except that the mixture was heated for two and one-half to three hours at 45° C. (and then at 60° C.) for two hours. For a number of reactions of this example the conversion to the allyl ether was found to range from 90 per cent to 100 per cent.

Example IX

Forty-two parts by weight of the sodium 2,4,6-tris(hydroxymethyl)phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200–300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)benzene, was a brown syrup. The theoretical yield was 54.8 parts by weight, the actual yield was 38.92 parts by weight or a 71 per cent yield.

Example X

Example IX was repeated using nineteen parts by weight of 2-methallyl chloride in place of the benzyl chloride. The methanol which had been added in Example XI to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example XI

Example IX was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example XII

Example IX was repeated using 23.3 parts by weight of 1,3-dichloropropene-1 in place of benzyl chloride and without the use of methanol. The 1-(3'-chloroallyloxy)-2,4,6-tris(hydroxymethyl)benzene was a viscous brown syrup. The yield was 40.82 parts by weight or 79 per cent of the theoretical value of 51.7 grams.

The claimed ethers of trimethylol phenols have been found to be useful as plasticizers for various resins. Their use in conjunction with the various resins increases remarkably the resistance of the resins to alkalis, acids, soap solutions, solvents, and other corrosive chemicals. The weatherability and resistance to salt spray of such treated resins is also greatly enhanced.

These ethers find use in low shrinkage casting resins and in molding and potting compounds. They are useful also in laminating resins and in the production of films, varnishes, wire coatings. The low water absorption and repellent characteristics produced by the ethers make them useful in hot- and cold-setting glues. They have been found also to act as mild curing agents for various synthetic rubbers and also add tack to and ease the milling of such materials.

In order to effect rapid cure of the claimed ethers of tri-(hydroxymethyl)phenol, catalysts are usually added. Acids or acid engendering reagents have been found most satisfactory. Where the ether group is unsaturated, sulphur and rubber accelerators, as well as metallic driers, are effective. Of the acid type, phosphoric acid has been found most suitable, but other acids such as hydrochloric, maleic, oxalic, etc., can be used.

A particularly suitable class of catalysts are the ammonia or amine salts of sulphuric or sulphonic acids, e. g., ammonium salts of p-toluene sulfonic acid, p-phenol sulfonic acid, o-phenol sulfonic acid; the morpholine salts of p- and/or o-phenol sulphonic acid, of benzene sulfonic acid; ethyl hydrogen sulphate; the urea salt of ortho and/or para phenol sulfonic acid, of p-toluene sulfonic acid; the mono urea, morpholine and ethanolamine salts of sulphuric acid.

This class of catalysts has several advantages. They are readily soluble in the ethers of tris-(hydroxymethyl)phenol and varnishes prepared from such ethers. The acid nature of the catalyst is modified so that corrosion of metallic containers and premature gelation of varnishes during storage is greatly reduced. An entirely unexpected advantage derived from the use of this class of catalysts is gloss retention in pigmented films. For example, the addition of several per cent of phosphoric acid to a paint, based on the allyl ether of tri-(hydroxymethyl) phenol and pigmented with $TiO_2$, will cause the paint to lose its gloss when baked to effect cure. However, several per cent of salts such as those derived from morpholine or urea and p- and/or o-phenol sulfonic acid can be added to the paint without deteriorating the gloss of the cured paint. In many cases the gloss of the cured film is actually improved over that of an uncatalyzed film by the addition of the catalyst.

The ethers have been found particularly useful as modifiers for the various vinyl type resins, e. g., polyvinyl alcohol, polyvinyl acetals (generically so designated) which include polyvinyl formal, polyvinyl acetal, polyvinyl butyral, etc., resins, obtained by the hydrolysis of polyvinyl esters, e. g., polyvinyl acetate, and then reacting the hydrolyzed product with the appropriate aldehyde, etc. The use of these ethers for this purpose is more particularly disclosed and claimed in my copending application Serial No. 204,465, filed concurrently herewith and assigned to the same assignee as the present invention.

The ethers of the 2,4,6-tris(hydroxymethyl) phenols may be compounded with fillers in varying proportions (e. g. zinc oxide, aluminum flake and powder, iron oxide, etc.) and used as coating resins.

In this connection, 1-allyloxy-2,4,6-tris(hydroxymethyl)benzene has been compounded with carbon black. After curing, the material was found to be unaffected when immersed in alkali solutions of up to forty per cent which were allowed to boil to dryness on its surface.

While ethers of 2,4,6-tris(hydroxymethyl)-phenols have been found to be very useful as plasticizers for various resins, they are rather expensive to produce in the pure state because of the separation process. It has been found that for many applications the ethers of the tris(hydroxymethyl)phenols can tolerate certain amounts of the ethers of 2-(hydroxymethyl)phenol, 4-(hydroxymethyl)phenol, 2,6-bis-(hydroxymethyl)phenol and 2,4-bis(hydroxymethyl)phenol. It has been further found that the presence of the ethers of the uni- and bis-compounds does not detract appreciably from the beneficial results obtained so long as the ether of the tris-compound is present in the major proportion of more than fifty per cent by weight. It will, of course, be apparent, mixtures of these ethers, where the trimethylol phenol ether constitutes less than 50% of the mixtures, are also contemplated. In general, if at least 2.5 mols of formaldehyde are used to each mol of phenol, the major proportion of the reaction product will be the tris(hydroxymethyl) compound. Consequently, the corresponding ether mixture will predominate in the ether of the tris(hydroxymethyl)phenol. The formula of such mixtures may be represented as follows:

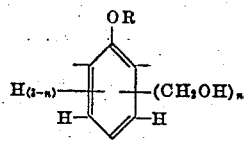

where, as pointed out previously, R represents an unsaturated aliphatic radical and halogenated unsaturated aliphatic radicals, and $n$ is an integer and is at least one but not more than three, and in which the compound in which $n$ is equal to three is in the major proportion.

Examples illustrating the production of such mixtures of methylol phenol ethers are as follows, where all parts are by weight.

*Example XIII*

Three hundred and fifty parts phenol and 900 parts 37.3% aqueous formaldehyde were mixed with stirring. To the solution was added 164 parts sodium hydroxide in 170 parts water and the whole reacted for six and one-half hours at 40° C. Analysis showed that 86.6 per cent of the formaldehyde had reacted to give about sixty per cent sodium tris(hydroxymethyl)-phenate along with the uni- and bis(hydroxymethyl)phenates. Three hundred and three parts by weight of allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts by weight of the allyl ethers of the mixed uni-, bis and tris(hydroxymethyl)phenols with the tris compound being present as the major component.

*Example XIV*

Three hundred and thirty-two parts phenol (96% pure) and 835 parts of a 36.4% aqueous solution of formaldehyde and 160 parts sodium hydroxide in 167 parts water were mixed and reacted for seven and one-half hours at 40° C. at which time 83.5 per cent of the formaldehyde had reacted to give a major proportion of sodium tris(hydroxymethyl)phenate as the product. Allyl chloride in the amount of 273 parts was added and the whole mass heated to 60° C. in an air tight reactor for three and one-half hours with vigorous stirring. At the end of this period 93.1 per cent of the allyl chloride had reacted. The isolated organic layer was dehydrated to yield 625 parts of the allyl ethers of mixed uni-, bis-, and tris(hydroxymethyl)-phenol with the tris compound as the major component as a brown somewhat viscous oil.

The hydroxymethylphenyl ethers of this invention may also be condensed to produce a variety of resins in conjunction with such materials as resorcinol, cardinol, etc. By reacting the ethers with polybasic acids, e. g., succinic, phthalic, etc., alkyd-type resins are produced which are useful in forming lacquers and films. They may also be used as curing agents for butadiene rubbers.

By reacting the tris-(hydroxymethyl)phenyl ethers with monohydric alcohols, substituted alcohols, such as ethanolamine or ethylene chlorohydrin, additional groups can be introduced into the molecule.

The properties of the above-described methylol phenyl ethers are believed to be unique for several reasons, among them being the monomeric form of the ether. Because of the monomeric characteristics of these methylol phenyl ethers, it is possible to obtain a better compatibility with resins than is possible by the use of etherified resinous condensation products of phenol and formaldehyde. In addition, these methylol phenyl ethers appear to be more readily soluble and dissolve more rapidly in a greater variety of solvents than etherified resinous materials. Moreover, the compositions herein claimed can be applied with spraying apparatus from solutions having much higher solids content than is possible with etherified phenolic resins. This permits substantial savings in the use of solvents and recovery thereof. Finally, the methylol phenyl ethers herein claimed have excellent shelf life, i. e., they can be stored for long periods of time at normal temperatures without danger of change in the constitution of the material due, for example, to condensation or polymerization of any reactive groups. The presence of the ether group aids substantially in maintaining the shelf life of the methylol phenyl ethers. However, the stability of the material at normal temperatures does not harm its ability to condense rapidly when it is desired to do so by the application of higher temperatures, for example, from 75° to 250° C.

What I claim as new and desire to secure by Letters Patent of the United States is:

1. A composition of matter comprising a compound corresponding to the general formula

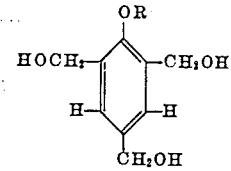

where R represents a member of the class consisting of unsaturated aliphatic radicals containing at least three carbon atoms, and halogenated derivatives of the aforesaid unsaturated aliphatic radicals.

2. A composition of matter comprising a mixture of ingredients comprising (1) a compound represented by the general formula

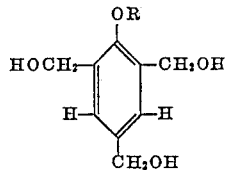

where R represents a member of the class consisting of unsaturated aliphatic radicals containing at least three carbon atoms and halogenated derivatives of the aforesaid unsaturated aliphatic radicals and (2) compounds corresponding to the general formula

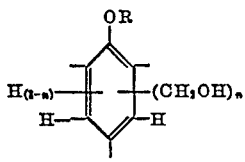

where $n$ represents one of the following: 1,2, and R has the meaning given above.

3. 1 - allyloxy - 2,4,6-tris(hydroxymethyl)benzene.

4. A composition of matter comprising a mixture of ingredients comprising (1) 1-allyloxy-2,-4,6-tris(hydroxymethyl)benzene and (2) a compound having the general formula

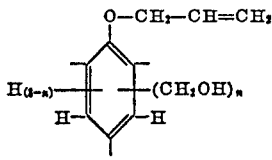

where $n$ is one of the following: 1,2.

5. 1 - methallyloxy-2,4,6-tris(hydroxymethyl)-benzene.

6. 1 - (2' - chloroallyloxy)-2,4,6-tris(hydroxymethyl)benzene.

7. The method of preparing a compound corresponding to the general formula

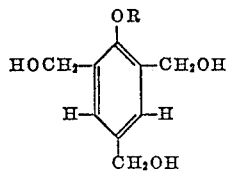

where R represents a member of the class consisting of unsaturated aliphatic radicals containing at least three carbon atoms, and halogenated derivatives of said unsaturated aliphatic groups, which process comprises reacting (1) previously isolated metallic 2,4,6 - tris(hydroxymethyl) - phenate where the metal atom replacing the hydrogen of the phenolic OH is a member of the class selected from sodium and barium with (2) a halide having the general formula RX where R has the meaning given above and X is a halogen of the class consisting of chlorine, bromine and iodine at a temperature not exceeding substantially 65° C.

8. The method as in claim 7 where R is the allyl group.

9. The method of preparing 1-allyloxy-2,4,6-tris(hydroxymethyl)benzene which comprises reacting preformed sodium 2,4,6-tris(hydroxymethyl)phenate with allyl chloride at a temperature not exceeding substantially 65° C.

10. A heat-converted material obtained by heating at a temperature of from 75° to 250° C. a composition comprising a compound corresponding to the general formula

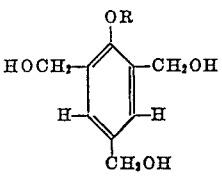

where R represents a member of the class consisting of unsaturated aliphatic radicals containing at least three carbon atoms, and halogenated derivatives of the aforesaid unsaturated aliphatic radicals.

11. A heat-converted material obtained by heating at a temperature of from 75° to 250° C. a mixture of ingredients comprising (1) a compound represented by the general formula

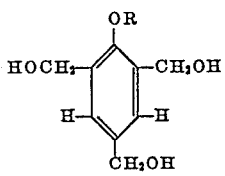

where R represents a member of the class consisting of unsaturated aliphatic radicals containing at least three carbon atoms and halogenated derivatives of the aforesaid unsaturated aliphatic radicals and (2) compounds corresponding to the general formula

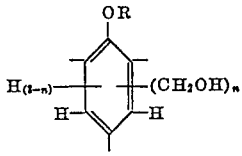

where $n$ represents one of the following: 1, 2, and R has the meaning given above.

12. A heat-converted material obtained by heating a composition comprising 1-allyloxy-2,4,6-tris(hydroxymethyl)benzene at a temperature of from 75° to 250° C.

13. A heat-converted material obtained by heating a composition comprising 1-methallyloxy-2,4,6-tris(hydroxymethyl)benzene at a temperature of from 75° to 250° C.

14. A heat-converted material obtained by heating a composition comprising 1-(2'-chloroallyloxy)-2,4,6-tris(hydroxymethyl)benzene at a temperature of from 75° to 250° C.

ROBERT W. MARTIN.

REFERENCES CITED

The following references are of record in the file of this patent:

UNITED STATES PATENTS

| Number | Name | Date |
| --- | --- | --- |
| 2,495,232 | Drisch et al. | Jan. 24, 1950 |
| 2,558,688 | Landa | June 26, 1951 |